United States Patent
Josten et al.

(10) Patent No.: US 8,242,395 B2
(45) Date of Patent: Aug. 14, 2012

(54) CIRCUIT BREAKER COMPARTMENT ARC FLASH VENTING SYSTEM

(75) Inventors: Harry W. Josten, Grapevine, TX (US); Keith Flowers, Euless, TX (US); Rahul Rajvanshi, Irving, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 510 days.

(21) Appl. No.: 12/362,715

(22) Filed: Jan. 30, 2009

(65) Prior Publication Data
US 2009/0212022 A1    Aug. 27, 2009

Related U.S. Application Data

(60) Provisional application No. 61/030,321, filed on Feb. 21, 2008.

(51) Int. Cl.
*H01H 9/02*    (2006.01)
(52) U.S. Cl. .................... 200/306; 218/149; 361/605
(58) Field of Classification Search ................ 200/306; 174/17 VA; 218/149, 150, 155–158; 361/605
See application file for complete search history.

(56) References Cited

U.S. PATENT DOCUMENTS

| | | | | |
|---|---|---|---|---|
| 5,359,174 A * | 10/1994 | Smith et al. | | 218/150 |
| 6,417,443 B1 * | 7/2002 | Smith | | 174/17 VA |
| 6,791,027 B1 * | 9/2004 | Nicolai et al. | | 174/50 |
| 6,924,721 B2 * | 8/2005 | Afshari et al. | | 335/202 |
| 7,821,774 B2 * | 10/2010 | Josten et al. | | 361/605 |
| 2006/0120027 A1 * | 6/2006 | Josten et al. | | 361/624 |
| 2007/0097604 A1 * | 5/2007 | Bruski et al. | | 361/605 |

* cited by examiner

*Primary Examiner* — Vanessa Girardi

(57) ABSTRACT

The present invention relates generally to a switchgear apparatus. More particularly, the invention encompasses a circuit breaker compartment arc flash venting system for a switchgear apparatus. The present invention also relates to enclosures for switchgear, panel boards, circuit breakers, and more particularly to an enclosure for low voltage switchgear and switchboard assemblies. The enclosure can be a walk-in type enclosure or a non-walk-in type enclosure. This invention further provides a method and apparatus for channeling plasma (hot arc gasses) that are generated from an arc. The circuit breaker compartment arc flash venting system is an integral part of an arc resistant switchgear assembly. The arc flash venting system works in conjunction with the bus insulation and ventilation systems in the switchgear apparatus to channel hot arc gasses (plasma) from a breaker compartment in the event of an internal arcing fault in the breaker compartment. The gasses are channeled to exit the upper rear of the breaker compartment and into the insulated section bus compartment. The hot arc gasses and other particulates then travel upward through the section bus compartment where they are routed to and safely discharged from the vent structure on the roof of the switchgear apparatus.

11 Claims, 5 Drawing Sheets

CIRCUIT BREAKER COMPARTMENT ARC FLASH VENTING SYSTEM

CROSS-REFERENCE TO RELATED APPLICATION

The instant patent application claims priority to and the benefit of the filing date of U.S. Provisional Patent Application Ser. No. 61/030,321, filed on Feb. 21, 2008, titled "Circuit Breaker Compartment Arc Flash Venting System," the entire disclosure of which is incorporated herein by reference.

FIELD OF THE INVENTION

The present invention relates generally to a switchgear apparatus. More particularly, the invention encompasses a circuit breaker compartment arc flash venting system for a switchgear apparatus. The present invention also relates to enclosures for switchgear, panel boards, circuit breakers, and more particularly to an enclosure for low voltage switchgear and switchboard assemblies. The enclosure can be a walk-in type enclosure or a non-walk-in type enclosure. This invention further provides a method and apparatus for channeling plasma (hot arc gasses) that are generated from an arc. The circuit breaker compartment arc flash venting system is an integral part of an arc resistant switchgear assembly. The arc flash venting system works in conjunction with the bus insulation and ventilation systems in the switchgear apparatus to channel hot arc gasses (plasma) from a breaker compartment in the event of an internal arcing fault in the breaker compartment. The gasses are channeled to exit the upper rear of the breaker compartment and into the insulated section bus compartment. The hot arc gasses and other particulates then travel upward through the section bus compartment where they are routed to and safely discharged from the vent structure on the roof of the switchgear apparatus.

BACKGROUND INFORMATION

Switchgear and switchboard are general terms which cover metal enclosures, housing switching and interrupting devices, such as fuses, circuit breakers, relays, along with associated control, instrumentation and metering devices, such as, bus bar, inner connections, and supporting structures, including, assemblies of these devices with associated buses, interconnections and supporting structures used for distribution of electric power.

There are High Voltage switchgear and switchboards, Medium Voltage switchgear and switchboards, and Low Voltage switchgear and switchboards. This invention is primarily directed towards the Low voltage switchgear and switchboards.

Low voltage switchgear and switchboards operate at voltages up to about 635 volts, and with continuous currents that can exceed about 5000 amperes. These Low voltage switchgear and switchboards are designed to withstand short-circuit currents up to about 200,000 amperes.

Low voltage switchgear equipment typically comprises of an assembly composed of multiple metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses that extend through insulated openings in the rear wall of the breaker compartments. The vertical buses in each section are supplied with current by a horizontal main bus that runs through the line-up. The rear of the section is typically an open area for the routing of cables.

Low voltage switchgear and switchboards are typically designed to withstand the effects of bolted (non-arcing) faults on the load terminals and this capability is validated during Short-Circuit Current and Short-Time Current Withstand Tests in IEEE Standard C37.20.1, the disclosure of which is incorporated herein by reference.

The occurrence of an arcing fault inside the switchgear produces physical phenomena that are different from bolted faults. For example, the energy resulting from an internal arc in air causes a sudden pressure and temperature increase inside the enclosure. Materials involved in or exposed to the arc produce hot decomposition products, both gaseous and particulate, which may be discharged to the outside of the enclosure. This sudden discharge of gaseous and particulate material normally damages the switchgear enclosure and its contents, but may also cause severe injury to an operator who may happen to be nearby.

Arc resistant switchgear qualified to IEEE C37.20.7, the disclosure of which is incorporated herein by reference, is intended to provide an additional degree of protection to the personal performing normal operating duties in proximity to the energized equipment. Accessibility Type 1 arc resistant switchgear has features at the front of the equipment. Accessibility Type 2 arc resistant switchgear has features at the front, sides and rear of the equipment.

Standard metal-enclosed switchgears are designed to withstand the mechanical forces generated by bolted faults on the load terminals until a power circuit breaker or other protective device can interrupt the flow of fault current. This capability is verified by short-circuit and short-time withstand tests on the equipment and interruption tests on the power circuit breakers. During a bolted fault, the voltage at the fault location is essentially zero and the fault energy is dissipated throughout the power system. The arc generated within the power circuit breaker during interruption is cooled and extinguished by the breaker arc chutes. The minimal out gassing of arc byproducts from the arc chutes is contained by the switchgear as verified by interruption tests.

However, it has now been observed that the circuit breaker compartment is also one of the likely places for an arcing fault to occur in switchgear and thus there is a need to address this problem.

An internal arcing fault can be caused by insulation degradation, insulation, contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates severe mechanical and thermal stress in the equipment which can blow open doors and covers and burn through or fragment the enclosure and/or cause severe injury to an operator who may happen to be nearby.

Thus there is a need in arc resistant switchgear design to provide a means to channel the hot decomposition products created by an internal arcing fault away from the front or the front, sides and rear of the equipment and away from personnel.

There is also a need to ventilate arc fault gasses from the rear of the circuit breaker compartment to the top of the switchgear apparatus where they can be safely discharged to the outside environment.

This invention overcomes the problems of the prior art and provides a novel method and an apparatus for switchgear assemblies for arc flash venting system, and especially for a circuit breaker compartment.

PURPOSES AND SUMMARY OF THE INVENTION

The invention is a novel method and an apparatus for switchgear assemblies, and for providing an arc flash venting system, and especially for a circuit breaker compartment.

Therefore, one purpose of this invention is to provide a novel method and an apparatus for switchgear assemblies, and for providing an arc flash venting system, especially for a circuit breaker compartment.

Another purpose of this invention is to provide a channel within a switchgear apparatus for safely and securely channeling of sudden gaseous and particulate discharge occurring from an arcing fault inside the switchgear.

Yet another purpose of this invention is to provide an insulative venting means for a switchgear apparatus which allows for the safe and secure channeling of a sudden gaseous and particulate discharge occurring from an arcing fault inside the switchgear.

Therefore, one aspect of this invention comprises a circuit breaker compartment having an integrated arc flash venting system, comprising:
(a) a circuit breaker compartment having a first side wall having a first base edge and a first side edge, a second side wall having a second base edge and a second side edge, a base connecting said first base edge of said first side wall to said second base edge of said second side wall, and a back wall connecting said first side edge of said first side wall to said second side edge of said second side wall and forming said circuit breaker compartment, and
(b) at least one vent openings in said circuit breaker compartment for the passage of an arc flash, and thereby forming said circuit breaker compartment having an integrated arc flash venting system.

Another aspect of this invention comprises a switchgear assembly having an integrated arc flash venting system, comprising:
(a) a circuit breaker compartment having a first side wall having a first base edge and a first side edge, a second side wall having a second base edge and a second side edge, a base connecting said first base edge of said first side wall to said second base edge of said second side wall, and a back wall connecting said first side edge of said first side wall to said second side edge of said second side wall and forming said circuit breaker compartment;
(b) at least one vent openings in said circuit breaker compartment for the passage of an arc flash; and
(c) a switchgear, said switchgear having at least one section bus compartment, wherein said at least one section bus compartment is formed by a first insulating side barrier, and a second insulating side barrier, an insulating rear barrier connects said first insulating side barrier to said second insulating side barrier, and wherein said section bus compartment allows the passage of an arc flash from said at least one vent opening in said circuit breaker compartment, and thereby forms said switchgear assembly having an integrated arc flash venting system.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

This invention provides a method and apparatus for an improved switchgear apparatus. This invention provides a means to vent hot gasses from the circuit breaker compartments in the front of the switchgear through the section bus compartment to the top of the switchgear.

This invention further uses an insulated section bus compartment with three individual chambers, one for each phase, to reduce the possibility of having an arc re-strike in the bus compartment.

Figure 1:
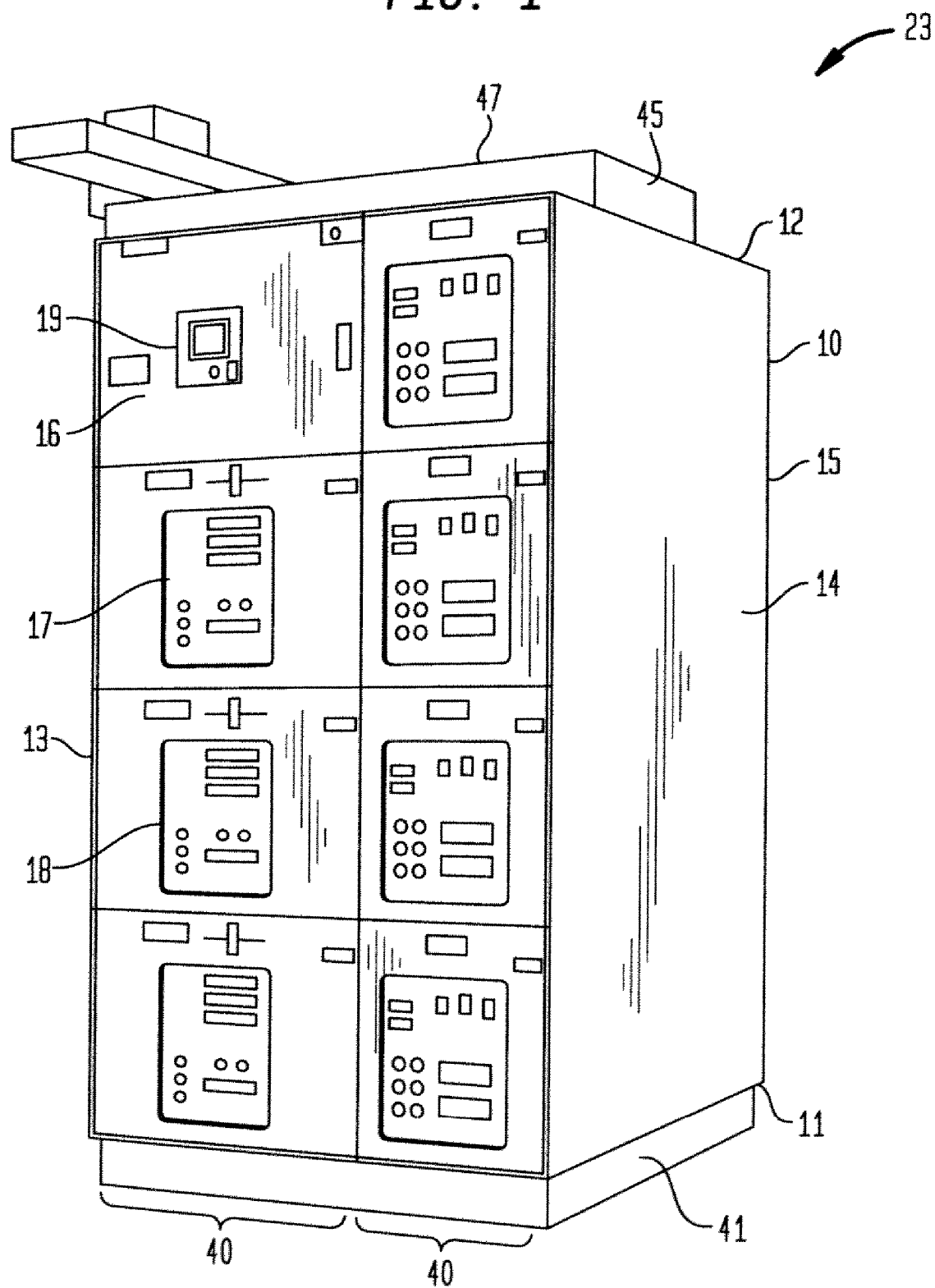
FIG. 1 is a novel switchgear assembly which is used to illustrate an embodiment of the present invention.

FIG. 1 is a novel switchgear assembly 23, which is used to illustrate an embodiment of the present invention. As shown in FIG. 1, the switchgear assembly 23, comprises of a plurality of switchgear sections 40, assembled on at least one mounting base or sill channel 41. Each switchgear section 40, can contain up to six compartments 17, such as, a circuit breaker compartment 17, containing one circuit breaker 18, per each circuit breaker compartment 17. The switchgear assembly 23, further comprises of an enclosure or housing 10, which has a bottom panel or base 11, a top panel or cover 12, a first side panel or cover or wall 13, a second side panel or cover or wall 14, a back panel or cover 15, and a frontal panel or assembly or cover 16. One or more of the compartments 17, may also contain electronic devices or electronic devices modules 19. In some situations the breaker compartment may contain a devices module 19, instead of a circuit breaker 18. Each switchgear section 40, has at least one ventilation means or structure 45, located on the top panel or cover 12. The ventilation means 45, has at least one opening or vent 47.

Figure 2:
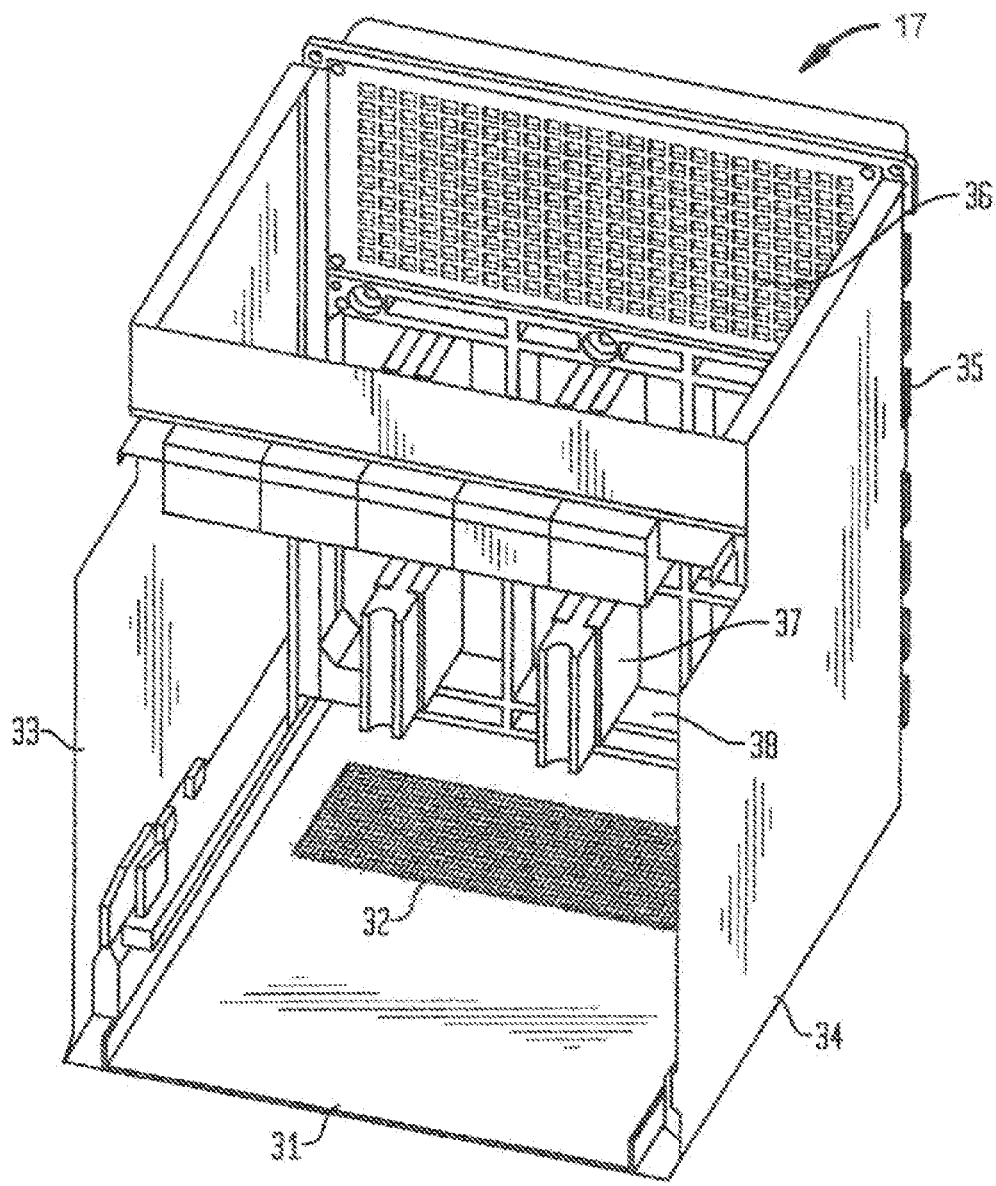
FIG. 2 is a novel arc resistant circuit breaker compartment with an internal arc venting means for a switchgear assembly which is used to illustrate an embodiment of the present invention.

FIG. 2 is a novel arc resistant circuit breaker compartment 17, with an internal arc venting means 32 and/or 36, for a switchgear assembly 23, which is used to illustrate an embodiment of the present invention. As shown in FIG. 2, the circuit breaker compartment 17, with the circuit breaker 18, front door and top covers removed to reveal the internal features. The compartment 17, has a bottom or base 31, a first side panel 33, a second side panel 34, and a back side panel or rear wall 35. The bottom or base 31, has a plurality of vents or openings 32. Similarly, the back side panel or rear wall 35, has a plurality of vents or openings 36. It is preferred that the vented panel 35, having vents or openings 36, is made of an insulating material at least in the upper rear portion of the panel 35. There are typically six circuit breaker primary disconnects 37, mounted in one or more insulating supports 38. The vented panel 35, having the vents 36, and the insulating supports 38, form the rear wall of the compartment 17. The sides 33, 34, and the bottom or base 31, of the compartment 17, are preferably made of steel or similar such material.

Figure 5:
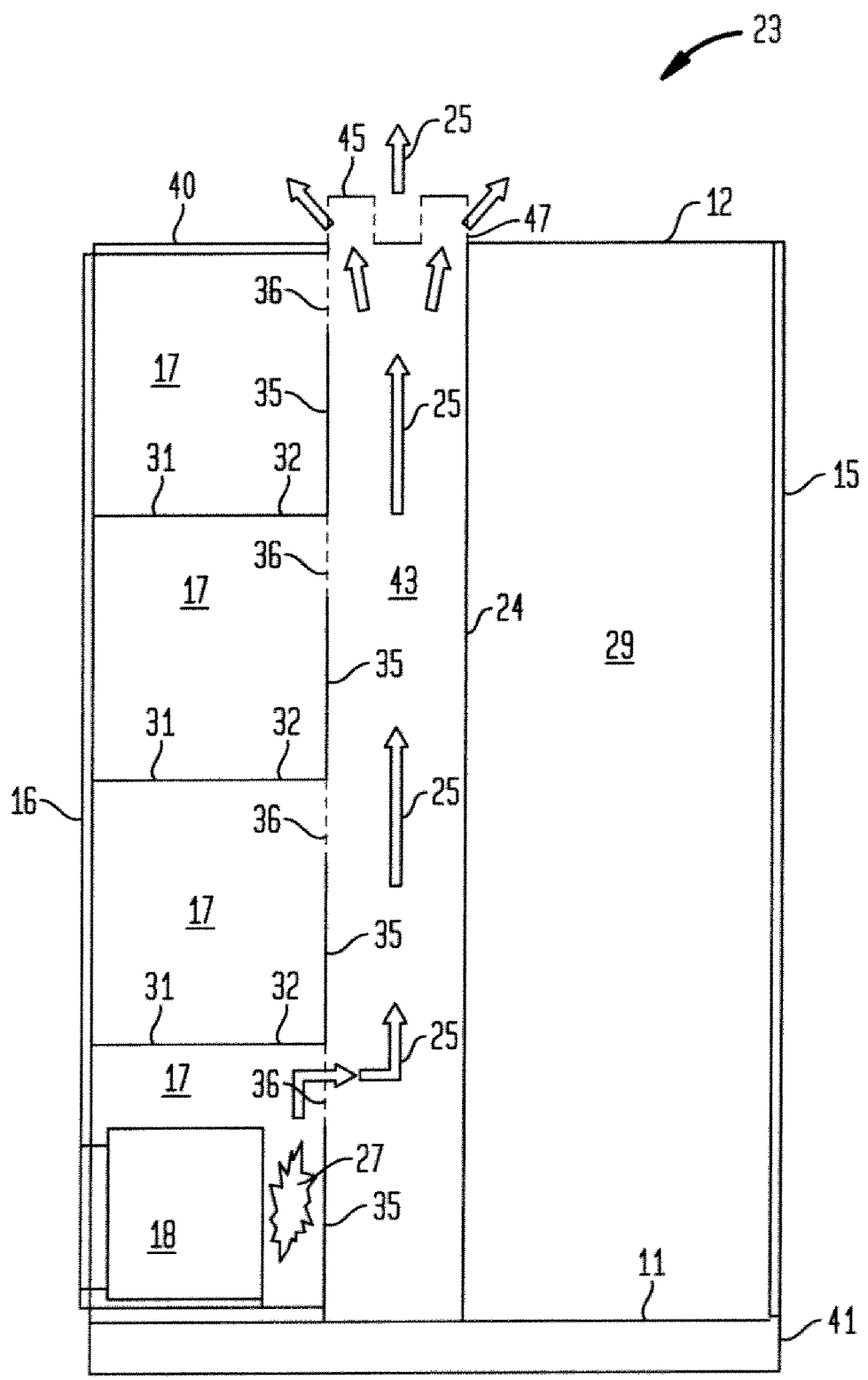
FIG. 5 is a side sectional view of the inventive arc resistant switchgear apparatus which is used to illustrate an embodiment of the present invention.

An accidental discharge of electrical energy or arc flash 27, (shown in FIG. 5) which can occur if a foreign object simultaneously contacts two or more primary disconnects 37, or one or more primary disconnects 37, and a part of the grounded steel enclosure 17, The vented panel 35, having the vents 36, is designed to vent the arc flash gasses and related contaminants 25, (shown in FIG. 5) out of the circuit breaker compartment 17, and into the section bus compartment 43, as more clearly shown in FIG. 5.

Figure 3:
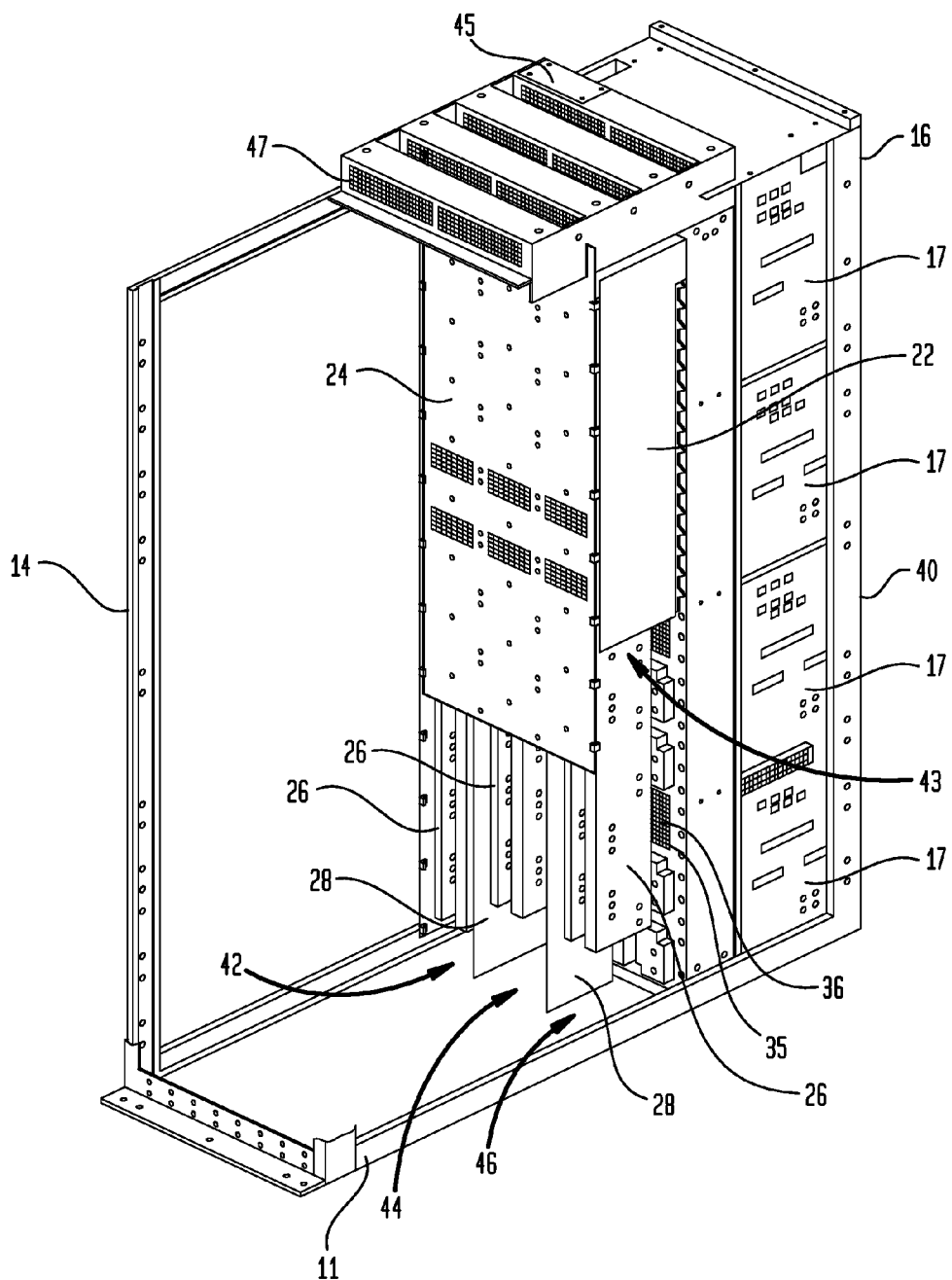
FIG. 3 is a rear view portion of an arc resistant switchgear section to further illustrate the invention.

FIG. 3 is a rear view portion of an arc resistant switchgear section 40, to further illustrate the invention. As shown in FIG. 3, which is a rear view of an arc resistant switchgear section 40, where the covers have been removed to reveal the section bus compartment 43, which is more clearly shown in FIG. 5. The section bus compartment 43, is formed by using at least one insulating side barrier or wall 22, at least one insulating rear barrier or wall 24, and the back sides of the vented panels 35, having the vents 36, and insulating supports 38.

Figure 4:
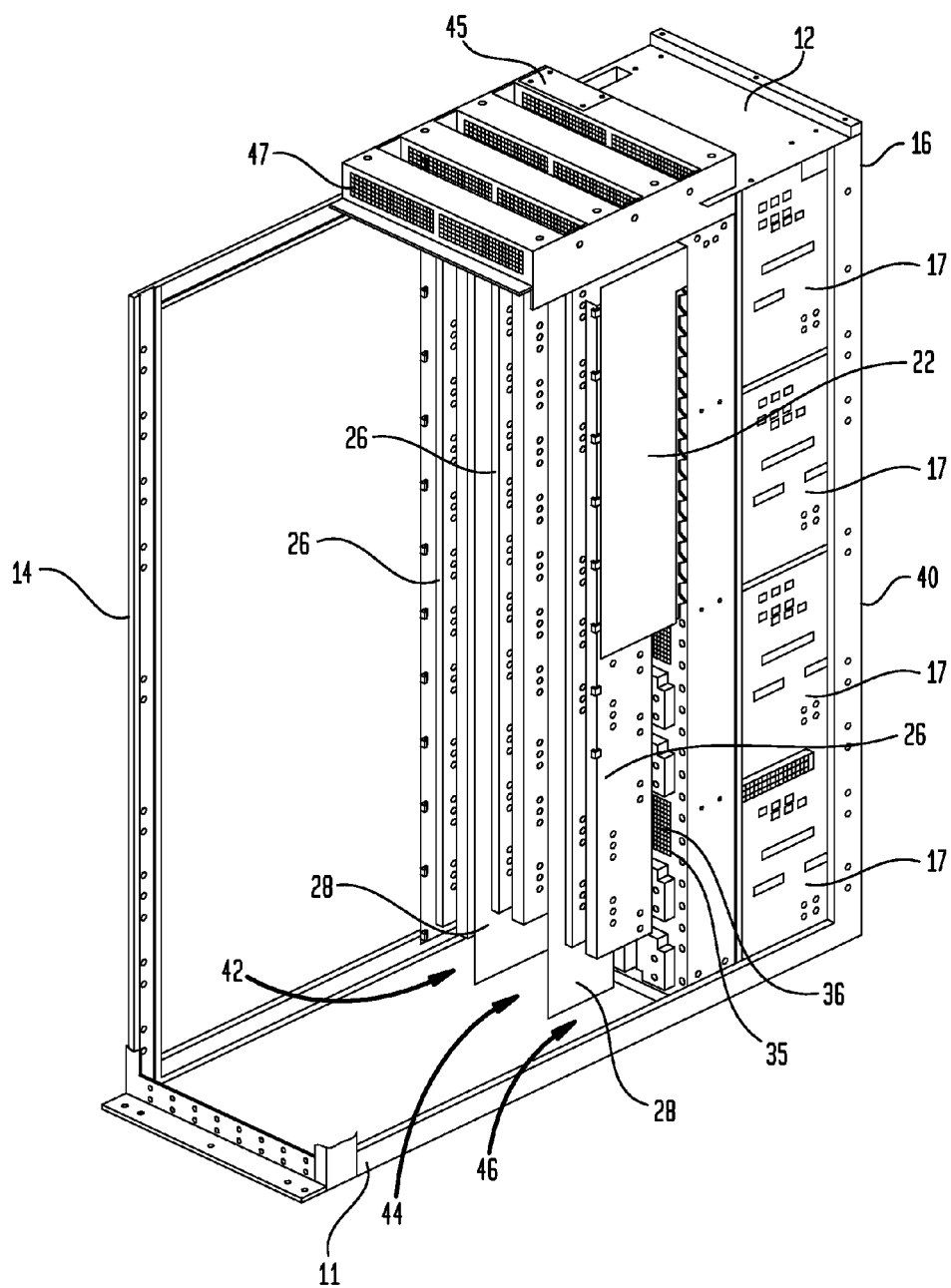
FIG. 4 is a rear view portion of an arc resistant switchgear section to further illustrate the invention.

FIG. 4 is a rear view portion of an arc resistant switchgear section 40, to further illustrate the invention, FIG. 4, further shows a rear view of the section bus compartment 43, with the rear insulating barrier 24, removed to reveal the common section bus or phase conductors 26, and the inter-phase barriers 28, that separate the section bus phases into three separate section bus compartment chambers 42, 44, and 46. The section bus compartment chambers 42, 44, and 46, isolate each phase conductor 26, from the other phases 26, and from ground. The section bus compartment 43, is open at the top and bottom for ventilation. The ventilation means 45, having the vents 47, of the section bus compartment 43, directs the arc flash gasses 25, (shown in FIG. 5) to the ventilation means or structure 45, where the gasses and particulates 25, can be safely discharged to the outside of the switchgear apparatus 23, via at least one vent or opening 47.

FIG. 5 is a side sectional view of the inventive arc resistant switchgear apparatus 23, which is used to illustrate an embodiment of the present invention. As shown in FIG. 5, the arc resistant switchgear section 40, has four circuit breaker compartments 17, and the circuit breaker compartment arc flash venting system which is mounted on a sill channel or mounting base 41. The circuit breaker compartments 17, have ventilation holes 32, preferably in the rear of the compartment's bottom plate or base 31. When an arcing fault 27, typically an electric arc or an arc flash 27, occurs in a breaker compartment 17, the arc flash gases or plasma 25, is channeled to exit the breaker compartment 17, through the bottom ventilation holes 32, and the rear panel ventilation holes 36, in the backside panel or rear wall 35, and into the section bus compartment 43. The gases and other particulate discharge 25, then is directed to exit upward towards the ventilation means or structure 45, where it is safely discharged to the outside air through at least one ventilation hole or opening 47, which is on the upper or top cover 12, of the switchgear section 40. It should be appreciated that the electric arc flash 27, is shown in the circuit breaker primary disconnect area behind the circuit breaker 18, however, the electric arc flash 27, can occur anywhere inside the compartment 17. As stated earlier that hot gasses or plasma 25, from the arc flash 27, expand and exit the circuit breaker compartment 17, through the vents or openings 36, in the back or rear panel 35, and then enter the bus compartment 43. The gasses and related particulates 25, are channeled through the section bus compartment 43, to the ventilation means or structure 45, on the roof or top panel or cover 12, for the switchgear section 40, where they are discharged to the outside of the switchgear enclosure or housing 10, via at least one vent opening 47. The three separate and insulated chambers 42, 44, 46, in the section bus compartment 43, prevent the arc 27, from re-striking in the section bus by separating the section bus conductor or phases 26, from each other and from grounded metal.

As one can see that with this invention a means for venting arc gasses and other particulates 25, from the circuit breaker compartment 17 that utilizes a phase insulated section bus compartment 43, with individual chambers 42, 44, and 46, for each phase bus for the plenum, is provided.

This invention further provides an arc resistant, enclosure 10, especially, for low voltage switchgear, and has been designed to provide an additional degree of protection for personnel performing normal operating duties in proximity to the energized equipment. Such duties include opening or closing circuit breakers, closed door racking of circuit breakers, reading of instruments, or other activities that do not require the opening of doors or removal of the covers.

As one can appreciate that with this internal venting system of this invention the arc passage vents and channels the flow of the arc fault gases and plasma, and vents these gases and other related contaminants out of the top of the switchgear and away from any personnel that may be present in the vicinity of the electric arc flash.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A switchgear assembly having an integrated arc flash venting system, comprising:
   (a) a circuit breaker compartment having a first side wall having a first base edge and a first side edge, a second side wall having a second base edge and a second side edge, a base connecting said first base edge of said first side wall to said second base edge of said second side wall, and a back wall connecting said first side edge of said first side wall to said second side edge of said second side wall and forming said circuit breaker compartment;
   (b) a bottom vent opening formed in said base and a back vent opening formed in said back wall for the passage of arc flash gases and contaminants; and
   (c) a switchgear, said switchgear having at least one section bus compartment, wherein said at least one section bus compartment is formed by a first insulating side barrier, and a second insulating side barrier, an insulating rear barrier connects said first insulating side barrier to said second insulating side barrier, wherein said at least one section bus compartment includes a plurality of phase conductors each separated by interphase insulation barriers to form a corresponding plurality of section bus compartment chambers and wherein all of the arc flash gases and contaminants pass through said bottom and back vent openings in said circuit breaker compartment and into said at least one section bus compartment wherein said at least one section bus compartment forms a single pathway for channeling all of the arc flash gases and contaminants to outside air.

2. The switchgear assembly having an integrated arc flash venting system of claim 1, wherein said switchgear assembly has at least one arc flash ventilation means.

3. The switch gear assembly having an integrated arc flash venting system of claim 1, wherein said switchgear assembly has at least one arc flash ventilation means, and wherein said arc flash ventilation means are located in a cover of said switchgear assembly.

4. The switchgear assembly having an integrated arc flash venting system of claim 1, wherein said section bus compartment further comprises at least one section bus conductor, and wherein said at least one section bus conductor is in electrical contact with at least one circuit breaker in said circuit breaker compartment.

5. The switchgear assembly having an integrated arc flash venting system of claim 1, wherein said switchgear has at least one mounting base.

6. The switchgear assembly having an integrated arc flash venting system of claim 1, wherein said back wall has at least one circuit breaker primary disconnect.

7. The switchgear assembly having an integrated arc flash venting system of claim 1, wherein at least a portion of said back wall has at least one coating of at least one insulating material.

8. The switchgear assembly having an integrated arc flash venting system of claim 1, wherein at least a portion of said base has at least one coating of at least one insulating material.

9. The switchgear assembly having an integrated arc flash venting system of claim 1, wherein said switchgear is low voltage switchgear.

10. The switchgear assembly having an integrated arc flash venting system of claim 1, wherein said switchgear includes three section bus compartment chambers.

11. The switchgear assembly having an integrated arc flash venting system of claim 1, wherein said first side wall, said second side wall and said base of said circuit breaker compartment are made of steel.

\* \* \* \* \*